United States Patent [19]

Crews

[11] Patent Number: 5,021,538

[45] Date of Patent: Jun. 4, 1991

[54] POLYIMIDE/POLYAMIDE DERIVATIVES OF DIELS-ALDER/ENE ADDUCTS OF PHENOL-MODIFIED ROSIN ESTERS

[75] Inventor: Everett Crews, Charleston, S.C.

[73] Assignee: Westvaco Corporation, New York, N.Y.

[21] Appl. No.: 444,593

[22] Filed: Dec. 1, 1989

[51] Int. Cl.$^5$ .................. C08G 14/02; C08G 8/34; C09F 1/00; C08L 63/00
[52] U.S. Cl. .................. 528/129; 525/390; 525/396; 523/160; 523/161; 527/603
[58] Field of Search .............. 528/129; 525/390, 396; 523/160, 161; 527/603

[56] References Cited

U.S. PATENT DOCUMENTS 4,514,540  4/1985  Peck .................................. 523/160
4,857,624  8/1989  De Blasi et al. ..................... 528/129

*Primary Examiner*—Earl Nielsen
*Assistant Examiner*—Kathryne E. Shelborne
*Attorney, Agent, or Firm*—Terry B. McDaniel; Richard L. Schmalz

[57] ABSTRACT

Improved polyol esters of phenol-rosin condensates and polyimide/polyamide derivatives thereof and their method of manufacture are disclosed as well as their applications as varnishes for lithographic inks and in pigment dispersion (flushing). Advantages of ink varnishes comprising these derivatives include higher water yields, increased gloss, transparency, and color strength, as well as reduced bronzing in both pigment concentrates and finished lithographic inks.

16 Claims, No Drawings

POLYIMIDE/POLYAMIDE DERIVATIVES OF DIELS-ALDER/ENE ADDUCTS OF PHENOL-MODIFIED ROSIN ESTERS

BACKGROUND OF THE INVENTION (1) Field of the Invention

This invention relates to new compositions of matter, particularly to Diels-Alder and ene adducts of phenolic-modified polyol esters of resin acids and more particularly to polyimide/polyamide phenolic-modified polyol esters derived therefrom which exhibit increased pigment dispersion efficiency, increased color development, and reduced bronzing in inks and related coatings.

(2) Description of the Prior Art

Lithographic inks consist primarily of pigments, natural and/or synthetic resins with high melting points (100° to 200° C.), alkyd resins, and hydrocarbon solvents. Low concentrations of plasticizers, antioxidants, chelates, pH modifiers, antiskinning agents, and other additives also are included in lithographic ink formulations.

The natural and synthetic high-melting resins are typically either petroleum-derived or wood-derived. Used solely or in combination, these resins are dissolved in the high-boiling hydrocarbon solvents to give homogeneous systems well known in the art as varnishes. Varnishes usually contain 20 to 70% resin solids. The alkyds, plasticizers, antioxidants, etc. are often included in the varnish, so that solids levels may exceed 70%.

It is known to those skilled in the art that in order to prepare phenolic resins, rosin may be reacted with phenols and formaldehyde to give phenol-rosin condensates which contain reactive double bonds and which may be reacted further in Diels-Alder and/or ene fashion with alpha, beta-unsaturated carbonyl compounds. These Diels-Alder and ene adducts of phenol-rosin condensates are then esterified with polyols to give broad molecular weight distribution resins with low residual acid number. This art is old and has been disclosed in numerous patents over the past decades.

Phenolic resins must meet several general requirements to be useful as lithographic ink resins. In order to make varnishes, for example, they must be capable of being dissolved in high-boiling hydrocarbon solvents to yield clear varnishes with manageable viscosities for easy workability. The varnishes must be stable in storage to viscosity, color, and clarity changes. On paper, the resin in the varnish or finished ink must dry to yield a durable, smooth, and uniform film with good resistance to abrasion and chemicals.

Moreover, it is appreciated that for phenolic resins to be useful as dispersing resins in lithographic ink pigment processing operations such as flushing, the resins must exhibit several specific properties in addition to the aforementioned requirements general to all lithographic ink resins. For example, when mixed with highly aqueous pigment presscake in high torque dough mixers commonly used for flushing operations, the resins present in the lithographic ink varnish must exhibit excellent pigment wetting properties. Such properties lead to rapid and thorough coverage of pigment particles present in the presscake and to the concurrent displacement of water originally bound to or entrained in the particle aggregates and agglomerates. Good wetting properties also lead to strong adhesion of resin to particle surfaces so that, as aggregates and agglomerates are broken down into primary particle units, resin will coat the particle surfaces thereby providing a steric barrier to particle-particle reaggregation and reagglomeration. Strong adhesion to and thorough coverage of surfaces of primary particle units by resin thus leads to increased color strength, gloss, and transparency, as well as reduced bronzing in the resulting pigment concentrate.

Strong pigment wetting characteristics are exhibited by compounds which have structures consisting of polar head groups attached to oleophilic tail segments. The polar head groups bind to the polar pigment particle surfaces while the oleophilic tail segments solubilize the bound particle with the continuous medium and also provide a steric barrier to particle-particle interactions.

Heretofore it was difficult with phenolic resins to impart this type of structure which enables strong pigment wetting characteristics. The known methods mentioned previously for preparing phenolic resins yield highly-crosslinked, nonuniform, three-dimensional resin molecules which do not meet the necessary structural requirement on the molecular level for enhanced pigment wetting. Via common synthetic methods, the only polar units present in phenolic resins are the hydroxyl and carboxyl functionalities; and these are sterically hindered within the highly-crosslinked, three-dimensional structure of the resin molecules; hence they are unavailable often for interaction with polar pigment particle surfaces.

From the prior art it is therefore apparent that polyol esters of the phenol-rosin condensates are prepared usually under methods which consist of reacting rosin with phenols and formaldehyde, followed by reaction with dienophiles and then subsequent esterification. Furthermore, from prior art descriptions, it is apparent that such synthetic methodologies lead to highly crosslinked, unordered, three-dimensional molecules which do not conform to structural requirements for good pigment wetting, namely they lack unhindered polar head groups attached to oleophilic tail segments.

Therefore, it is an object of the present invention to prepare novel Diels-Alder/ene adducts of polyol esters of phenol-rosin condensates.

It is another object of this invention to prepare novel polyimide/polyamide derivatives of the Diels-Alder/ene adducts of polyol esters of phenol-rosin condensates. It is another object of this invention to prepare Diels-Alder and ene adducts and their polyimide/polyamide derivatives from polyol esters of phenol-rosin condensates which are compatible with printing ink formulations.

It is still another object of this invention to prepare polyimide/polyamide derivatives of Diels-Alder and ene adducts of polyol esters of phenol-rosin condensates which have excellent pigment wetting characteristics as manifested in high water yields obtained during pigment dispersion operations known as flushing and as manifested in increased color strength, high gloss and low bronzing in pigment concentrates and in finished lithographic printing inks.

SUMMARY OF THE INVENTION

The present invention is an improvement in the process for preparing phenolic resins. The present invention overcomes failings of prior art resins by attaching polar polyimide/polyamide functional groups to oleophilic tails consisting of polyol esters of phenol-rosin condensates. The products of this improved process disclosed herein are useful in application in varnishes for pigment dispersion operations known as flushing.

The invention phenolic resins are made by first preparing a polyol ester of a phenol-rosin condensate of low residual acid number ($\leq 25$) and then reacting this intermediate, with an alpha, beta-unsaturated carbonyl compound under Diels-Alder and/or ene reaction conditions to obtain a simple adduct of the polyol ester of the phenol-rosin condensate. Also, the invention resides in polyimide or polyamide derivatives of such adducts of polyol esters of phenol-rosin condensates.

DESCRIPTION OF THE PREFERRED EMBODIMENTS

Methods for preparing the well known polyol esters of phenol-rosin condensates which are precursors to the invention compounds disclosed herein are generally known to those skilled in the art.

Numerous phenols have been employed to prepare useful phenol-rosin condensates. Among these are phenol, nonylphenol, octylphenol, bisphenol A, butylphenol, and the like.

Formaldehyde is typically introduced into the phenol-rosin reaction mixture in the form of solid paraformaldehyde, in the form of gaseous formaldehyde, or as an aqueous solution of formaldehyde. Formaldehyde-phenol-rosin condensation temperatures are between about 100° C. and about 220° C., preferably between about 130° C. to about 180° C., over from about 1.5 hours to about 8 hours, preferably from about 3 hours to about 6 hours. Catalysts employed to accelerate condensation reactions usually include alkali metal hydroxides, such as calcium hydroxide, and oxides such as magnesium oxide. Catalyst levels vary from 0.01 to 5.0 weight percent based on the rosin charge.

Numerous polyols may be used to esterify the phenol-rosin condensates. These include ethylene glycol, glycerol, pentaerythritol, xorbitol, and the like. Esterification temperatures and times are on the order of 180°–300° C. (preferably 250°–280° C.) and 1–8 hours, respectively. Reaction times are accelerated by application of vacuum or nitrogen sparge and by the use of catalysts and catalyst concentrations used in the previously cited condensation reaction. Reaction completion is determined by monitoring product acid number, since ester formation is indicated by a low residual acid number of no greater than 25. In the process of this invention, gum, wood, and tall oil rosins may be used equally well.

According to the method of this invention, Diels-Alder/ene adducts are prepared by reacting alpha, beta unsaturated carbonyl compounds with the polyesters of phenol-rosin condensates after acid numbers of the esters have reached 25 or below, preferably 20 or below. The reaction temperature is then adjusted to within the range of the adduction reaction temperature, which as previously indicated may be from 25° C. to 250° C. but preferably between 200° C. and 240° C. The alpha, beta unsaturated carbonyl compound is then combined with the polyol ester of the phenol-rosin condensate for from about 0.25–1.5 hours. The mixture is preferably reacted at the elevated temperature, 200°–240° C. for from 0.75–1 hour. An inert atmosphere is maintained throughout this sequence; and pressures employed in the reactors may be atmospheric, sub- or super-atmospheric.

Since reactive double bonds found in rosins, phenol-rosin condensates, and esters of such condensates range from isolated double bonds, typical of pimaric acid and pimaric-type acids, to conjugated double bonds, as found in abietic-type acid components, at typical Diels-Alder reaction temperatures which can range from 25° C. to 250° C. but preferably 200° C. to 240° C., ene reactions may occur with the carbon-carbon double bonds. Therefore, the novel adducts of polyol esters of phenol-rosin condensates embodied herein vary somewhat in the extent of Diels-Alder and/or ene adduction. This has no significant impact on either the physical properties of these novel adducts or on the pigment wetting characteristics of the novel compounds disclosed in this invention nor in the applications described herein.

Numerous alpha, beta-unsaturated carbonyl acid compounds may be employed to yield the novel adducts embodied herein. These include (in combinations or alone) maleic anhydride, fumaric acid, itaconic acid, acrylic acid and the like. When alkyl groups are methyl or ethyl, alkyl esters of the aforementioned acids may be employed solely or in combinations also.

Diels-Alder and ene adducts prepared by the method of this invention are readily dissolved in high-boiling hydrocarbon solvents to give varnishes useful in lithographic inks and in particular, in pigment dispersion operations known as flushing to yield pigment concentrates.

In general, the novel polyimide/polyamides embodied herein vary in composition depending on the extent of Diels-Alder and ene reactions which occur when polyol esters of the phenol-rosin condensates were heated with alpha, beta-unsaturated carbonyl acid compounds. Similarly, the ratio of polyimide to polyamide functionality depends upon the ratio of anhydride to carboxylic acid groups present in the precursor Diels-Alder/ene adduct.

The polyamines which may be employed for reactions with the polycarboxylic acids are those having the formula $H_2N(RNH)_xH$ where R is an alkaline or aromatic radical having from 2 to 10 carbon atoms. Preferably, polyamines enjoying usage in this invention will have from 2 to 6 carbon atoms per molecule so that x equals from 1 to 3. Examples of polyamines which may be reacted with the Diels-Alder/ene adducts are ethylene diamine, pentamethylene diamine, hexamethylene diamine, diethylene triamine, triethylene tetramine, 1,4-diaminobutane, 2-methylpentane-1,5-diamine, 1,8-diaminonaphthalene, and the like.

According to the method of the invention, the polyimide/polyamide derivatives of the Diels-Alder and ene adducts are prepared by adding the polyamine incrementally to the adduct at elevated temperatures. Polyimide/polyamide formation is instantaneous with one mole of water evolving from the reaction mixture per every imide or amide functional group formed. Reaction temperatures range from 100° to 250° C., preferably from 200° to 240° C. Time of reaction is from about 0.5 to 2 hours, preferably from about 0.75 to 1.5 hours.

Novel polyimide/polyamide resins prepared by the method of this invention are readily dissolved in high-boiling hydrocarbon solvents to give varnishes useful in lithographic inks and particularly in pigment dispersing operations known as flushing. Use of varnishes based upon these novel polyimide/polyamide compounds in dispersion processes results in higher water yields, increased gloss, transparency, and color strength, as well as reduced bronzing in both pigment concentrates and finished lithographic inks.

To further describe the manner and process of making and using the invention, but without intent of limitations, the following illustrative embodiment is set forth. Unless otherwise specified, reactions were carried out in an atmosphere of inert gas. Also, in the preparation set forth, parts and percentages are by weight of the rosin used.

EXAMPLE 1

A polyol (pentaerythritol) ester of a phenol-rosin (nonylphenol-tall oil rosin) condensate was prepared in the following manner. To a nitrogen purged reactor and under a continuous nitrogen flow of 0.003 pounds of nitrogen per pound of rosin per hour were added 11,100 pounds of tall oil rosin, 1,120 pounds of nonylphenol, and 14 pounds of lime. At a temperature of 170° C. and with stirring, 1,270 pounds of formalin (37% aqueous formaldehyde) were added over the course of 4 hours. Pentaerythritol (1,400 pounds) was then added, and the reaction temperature was raised to 280° C. where it was held until the acid number was less than 20. The pentaerythritol ester of the nonylphenol-rosin condensate had a softening point of 113° C., an acid number of 17, and a Gardner viscosity of Z3-- as measured at 25° C. and at 60% resin solids in a commercially available high-boiling hydrocarbon solvent known as Magiesol 47.

This polyol ester was then heated to 240° C. at which temperature 450 pounds of maleic anhydride were added. After one hour at this temperature, the Diels-Alder/ene adduct had a softening point of 126.2° C., an acid number of 33, a Gardner viscosity of Z7- as measured at 25° C. and at 60% resin solids in Magiesol 47, a tolerance to Magiesol 47 of 12.3%, and a color at 60% resin solids in Magiesol 47 of 9-10 Gardner color units.

To the Diels-Alder/ene adduct at 240° C. were added, over the course of 30 minutes, 240 pounds of 2-methylpentane-1,5-diamine. The polyimide/polyamide product exhibited the following physical properties: an acid number of 17.8, a softening point of 129° C., a Gardner viscosity at 25° C. and at 60% solids in Magiesol 47 of Z8+, and a tolerance to Magiesol 47 of 20.8%.

A varnish of this polyimide/polyamide product containing 60% resin solids was then used in a flushing operation to disperse lithol rubine pigment. The flushed pigment concentrate obtained had the following composition: 32.7 parts pigment; 6.5 parts linseed oil alkyd; 34.2 parts resin; 25.2 parts solvent; and 1.4 parts plasticizer. During the flushing operation, this varnish yielded 79-80% of the bound water in the pigment presscake. Commercially available varnishes tested gave at most 73% water yield. Furthermore, titanium dioxide bleaches of this flushed pigment concentrate gave 2 to 5% greater color strength than the commercially available varnishes, along with greater gloss and reduced bronzing.

Flushed pigment concentrates derived from the polyimide/polyamide product were let-down into finished lithographic inks by blending the concentrate with a standard let-down varnish used commercially to make heat-set web offset lithographic inks. For comparison, a commercially available pigment concentrate was also let-down with the same standard varnish. The finished ink based on the polyimide/polyamide flushed pigment concentrate gave gloss and transfer properties superior to the commercial ink, i.e., 43 and 1.8 compared to 40 and 1.9, respectively.

EXAMPLE 2

The preparation set forth in Example 1 was repeated except that the quantities (in grams) of reagents used to prepare the pentaerythritol ester of the nonylphenol-rosin condensate were as follows: rosin 1,200; nonylphenol 188.4; paraformaldehyde 65.2; and pentaerythritol 1,440. When esterified to an acid number of 10.4, this precursor pentaerythritol ester of nonylphenol-rosin condensate had a softening point of 125° C., a Gardner viscosity at 25° C. and at 60% solids in Magiesol 47 of Z7-, and a tolerance to Magiesol 47 of 9%.

To prepare the polyimide/polyamide derivative, 500 grams of the precursor polyol ester were heated at 210° C. with 21 grams of maleic anhydride for 1.5 hours. After 1.5 hours at 210° C., 2-methylpentane-1,5-diamine (13 grams) was added to the reaction mixture and stirred for 30 minutes. The polyimide/polyamide was then heated to 230° C. and aspirated for 5 minutes to remove residual water of reaction. Final product properties included the following: an acid number of 14; a softening point of 146; a Gardner viscosity, at 25° C. and at 50% solids in Magiesol 47, of Z4; and a tolerance to Magiesol 47 of 35%.

EXAMPLE 3

The preparation of Example 2 was repeated except that in order to prepare the polyimide/polyamide derivative, 400 grams of the precursor polyol ester and 12 grams of maleic anhydride were heated at 213° C. for 1.5 hours. After 1.5 hours at 213° C., the temperature was raised to 230° C.; and 2-methylpentane-1,5-diamine (7.43 grams) was added. After 0.5 hour at 230° C., the reaction mixture was aspirated for 5 minutes at 20 mm Hg prior to discharge. Final product properties included the following: an acid number of 13.4; a softening point of 140° C.; a Gardner viscosity, at 25° C. and at 50% solids in Magiesol 47, of Z4; and a tolerance to Magiesol 47 of 19.4%.

EXAMPLE 4

The preparation of Example 1 was repeated except that the quantities (in grams) of reagents used to prepare the pentaerythritol ester of the nonylphenol-rosin condensate were as follows: rosin 2,000; nonylphenol 200; paraformaldehyde 82; and pentaerythritol 244. When esterified to a acid number of 24.3, this precursor pentaerythritol ester of nonylphenol-rosin condensate had a softening point of 109° C., a Gardner viscosity at 25° C. and at 60% solids in Magiesol 47 of Z4, and a tolerance to Magiesol 47 of less than 5%. In order to prepare the polyimide/polyamide derivative, the precursor polyol ester was heated at 180° C. for 1.5 hours with 6.0 grams of maleic anhydride. Subsequently, the Diels-Alder/ene adduct thus formed was reacted for one hour with 1.84 grams of ethylene diamine to give a polyimide/polyamide product with the following properties: an acid number of 23; a softening point of 122° C.; a Gardner viscosity, at 25° C. and at 50% solids in Magiesol 47, of Z, and a tolerance to Magiesol 47 of 16%.

While this invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

What is claimed is:

1. The method of preparing a phenolic resin comprising the steps of:
    (a) forming a phenol-rosin condensate by introducing an aldehyde into a molten mixture of rosin and a phenol in an inert environment at a temperature of from about 100° C. to about 220° C. for from about 1.5 hours to about 8 hours;
    (b) forming a polyol ester of the phenol-rosin condensate by reacting the adduct with a polyol at a temperature of from about 200° C. to about 300° C. for from about 1 hour to about 8 hours; and
    (c) forming an adduct of the polyol ester of the phenol-rosin condensate by reacting the ester with a dienophile in an inert environment at a temperature of from about 25° C. to about 250° C. for from about 0.25 hour to about 1.5 hours.

2. The method of claim 1 comprising the further step of:
    (d) reacting the adduct of the polyol ester of the phenol-rosin condensate with a polyamine added incrementally to the adduct at a temperature of from about 100° C. to about 250° C. for from about 0.5 hour to about 2 hours to form derivatives of the adduct selected from the group consisting of polyimides and polyamides.

3. The method of claim 1 wherein the rosin is selected from the group consisting of wood rosin, gum rosin, and tall oil rosin, the phenol is selected from the group consisting of phenol, nonylphenol, octylphenol, bisphenol A, and butylphenol, the aldehyde is in the form selected from the group consisting of solid paraformaldehyde, gaseous formaldehyde, and an aqueous solution of formaldehyde, and the condensate is formed at a temperature of from about 130° C. to about 180° C. for from about 3 hours to about 6 hours.

4. The method of claim 3 wherein the condensate is formed in the presence of from about 0.01 to about 5%, based on weight, of a catalyst selected from the group consisting of alkali metal hydroxides and oxides.

5. The method of claim 1 wherein the rosin is tall oil rosin, the phenol is nonylphenol, the aldehyde is an aqueous solution of formaldehyde, and the condensate is formed at a temperature of 170° C. for 4 hours in the presence of a catalyst selected from the group consisting of calcium hydroxide and magnesium oxide.

6. The method of claim 1 wherein the polyol is selected from the group consisting of ethylene glycol, glycerol, pentaerythritol, and xorbitol and the ester is formed in an inert environment selected from the group consisting of vacuum and nitrogen sparge at a temperature of from about 250° C. to about 280° C. and the formed ester exhibits an acid number no greater than 25.

7. The method of claim 6 wherein the polyol is pentaerythritol, the inert environment is provided by nitrogen sparge, and the ester is formed at 280° C. and exhibits an acid number no greater than 20.

8. The method of claim 1 wherein the dienophile is selected from the group of alpha, beta unsaturated carbonyl compounds consisting of maleic anhydride, fumaric acid, itaconic acid, acrylic acid, alkyl esters thereof, and combinations thereof, and the adduct is formed in an inert environment at a temperature of from about 200° C. to about 240° C. for from about 0.75 to 1 hour.

9. The method of claim 8 wherein the alpha, beta unsaturated carbonyl compound is maleic anhydride and the adduct is formed at a temperature of 240° C. for 0.5 hour.

10. The method of claim 1 wherein the adduct formed is a mixture of products of Diels-Alder and ene adduction.

11. The method of claim 2 wherein the polyamine is described by the formula $H_2N(RNH)_xH$ where R is selected from the group consisting of alkaline and aromatic radicals having from 2 to 10 carbon atoms and where x is an integer from 1 to 3 and the adduct derivative is formed at a temperature of from about 200° C. to about 240° C. for from about 0.75 hour to about 1.5 hours.

12. The method of claim 11 wherein the polyamine is selected from the group consisting of ethylene diamine, pentamethylene diamine, hexamethylene diamine, diethylene triamine, triethylene tetramine, 1,4-diaminobutane, 2-methylpentane-1,5-diamine, and 1,8-diaminonaphthalene.

13. The method of claim 12 wherein the polyamine is 2-methylpentane-1,5-diamine and the derivative is formed at a temperature of 240° C. for 0.5 hour.

14. The product of the method of claim 1.

15. The product of the method of claim 2.

16. A varnish for a lithographic ink pigment dispersion comprising the product of claim 15.

* * * * *

UNITED STATES PATENT AND TRADEMARK OFFICE
CERTIFICATE OF CORRECTION

PATENT NO. : 5,021,538

DATED : June 4, 1991

INVENTOR(S) : Everett Crews

It is certified that error appears in the above-indentified patent and that said Letters Patent is hereby corrected as shown below:

In column 3, line 5, delete "($\leq$25)" and substitute therefor --($\leq$25)--.

In claim 5, column 7, line 43, delete "1" and substitute therefor --4--.

Signed and Sealed this

Twenty-sixth Day of October, 1993

Attest:

BRUCE LEHMAN

Attesting Officer     *Commissioner of Patents and Trademarks*